O. EPPENSTEIN.
REFRACTING PRISM.
APPLICATION FILED MAY 22, 1913.
1,081,031.
Patented Dec. 9, 1913.
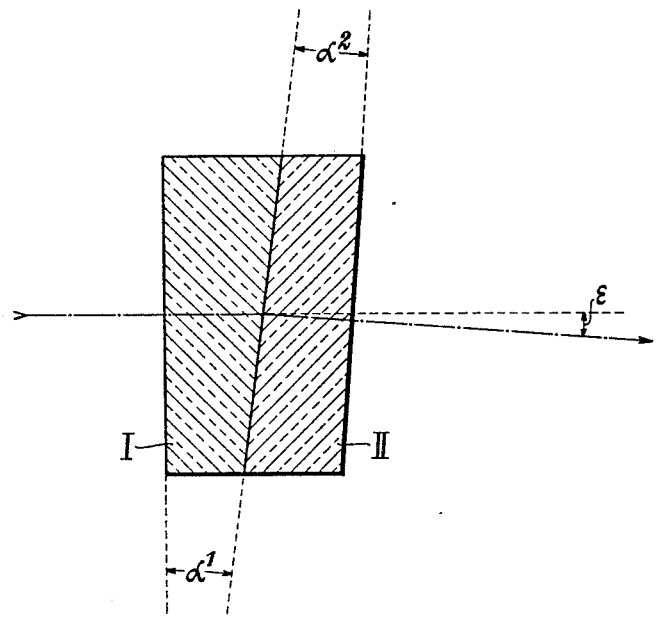

UNITED STATES PATENT OFFICE.

OTTO EPPENSTEIN, OF JENA, GERMANY, ASSIGNOR TO THE FIRM OF CARL ZEISS, OF JENA, GERMANY.

REFRACTING-PRISM.

1,081,031.  Specification of Letters Patent.  Patented Dec. 9, 1913.

Application filed May 22, 1913. Serial No. 769,276.

*To all whom it may concern:*

Be it known that I, OTTO EPPENSTEIN, a citizen of the German Empire, residing at Jena, Germany, have invented a new and useful Refracting-Prism, of which the following is a specification.

The present invention has for its object the elimination of an inconvenience in the use of such refracting prisms as are intended to deflect a pencil system of parallel rays and to transmit the same to a lens system.

As is well known, a ray pencil, which has passed through a prism, is divided at the surface of emergence of the latter into two part-pencils, one of which emerges directly from the prism, while the other one is reflected toward the entrance surface. A part of this latter part-pencil is again reflected toward the surface of emergence and then emerges (although not completely) from the prism. Hence, when a refracting prism is employed for the purpose stated above, *e. g.* when it is disposed for measuring purposes in front of one of the two objective lenses of a telemeter and so as to rotate about the axis of the said lens, whether singly or behind a second prism, which is rotatable in the opposite direction, the lens system lying behind the prism forms besides the image, which is derived from the rays emerging directly from the prism, in the same image-plane a second, disturbing image, which appertains to the rays emerging after being twice reflected. In order to eliminate this inconvenience, according to the invention a refracting prism intended to deflect a pencil-system of parallel rays and to transmit the same to a lens system is made up of two members, which are cemented together, the refractive index and the refractive angle in each member being of such a size that for a chosen direction of the rays entering the prism the rays emerging after being reflected at the surface of emergence and the surface of entrance of the said prism are parallel to the rays emerging directly. For, this being the case, the two images, which a lens system forms from a pencil system of parallel rays impinging on the prism in the chosen direction, coincide. The calculation of such a prism may be carried out in the following manner. When the perpendicular direction is chosen as the one, in which the rays enter the prism, it is clear, that, in order to comply with the idea of the invention, the rays must also pass perpendicularly through the surface of emergence. This being the case, the rays, which do not emerge directly, are thrown back, both at the first and at the second reflection, into themselves and leave the prism, each of them, at the same place as the rays emerging directly. If $\alpha^1$ represent the absolute value of the refractive angle of the front member, $\alpha^2$ that of the rear member and $\varepsilon$ the absolute value of the deflection effected by the prism, then in this special case $$\alpha^1 - \alpha^2 = \varepsilon,$$

as a deflection takes place only at a single surface, viz. the cemented surface. If $n^1$ represent the refractive index of the front member and $n^2$ that of the rear member, then $$\tan.\left(\frac{\alpha^1 - \alpha^2}{2}\right) = \frac{n^2 - n^1}{n^2 + n^1} \tan.\left(\frac{\alpha^1 + \alpha^2}{2}\right).$$

After several transformations there results from these two equations the relation $$\tan.\left(\alpha^1 - \frac{\varepsilon}{2}\right) = \frac{n^2 + n^1}{n^2 - n^1} \tan.\frac{\varepsilon}{2}.$$

Hence, the deflection to be effected by the prism being given and the kinds of glass to be employed being chosen, $\alpha^1$ may be deduced from the last equation. $\alpha^2$ then follows from the relation $$n^1 \sin. \alpha^1 = n^2 \sin. \alpha^2.$$

As a further investigation will show, a prism, which is intended for only a slight total deflection and is calculated for a perpendicular direction of entrance, will comply with the invention sufficiently closely for practical purposes, even for considerable deviations of the entering ray from the perpendicular line. Hence, when *e. g.* a prism placed in front of a telemeter for the purpose mentioned above is formed, so as to correspond to the invention, the instrument, even where the field of vision on the object side is of considerable size, is free from double images over the whole extent of the field of vision.

Making use of the above-mentioned relation $$n^1 \sin. \alpha^1 = n^2 \sin. \alpha^2,$$

it follows, that the two kinds of glass used must comply with the condition $$\frac{n^1{}_F - n^1{}_C}{n^1{}_C} = \frac{n^2{}_F - n^2{}_C}{n^1{}_C},$$

if the prism is to be achromatic.

If it appears desirable to be independent of this condition in the choice of the kinds of glass, in order to remove the chromatic aberrations, two prisms corresponding to the present invention, which have a different sized deflection but the same dispersion, may be disposed one behind the other in such a manner that the same ray pencil system can impinge on them one after another each in the direction chosen, the two partial deflections, which the pencil system suffers, having opposite signs. The dispersion effected by the front prism is then neutralized by the rear one, while a total deflection remains, which is equal to the difference of the two partial deflections. When, in such a case, the two inner members consist of the same kind of glass and their adjacent surfaces are parallel to one another, they can be combined, so as to form one piece, such an achromatic prism system then consisting of only three members, which are cemented together.

The following table contains in the first place for two prisms the particulars for the size of the chosen deflection, the kinds of glass and the refractive angles, which prove to be necessary from the foregoing. In both prisms the chromatic aberrations are not done away with.

| $\varepsilon =$ | 2' | 3' |
|---|---|---|
| $n^1{}_D =$ | 1.5162 | 1.5162 |
| $n^2{}_D =$ | 1.6202 | 1.6202 |
| $\alpha^1 =$ | $-31' 10''$ | $-46' 44''$ |
| $\alpha^2 =$ | $29' 10''$ | $43' 44''$ |

Should for instance the second of these two prisms be achromatic, instead of the kinds of glass employed above the following ones could for example be used:

$n^1{}_C = 1.52558$, $n^1{}_D = 1.5286$, $n^1{}_F = 1.53583$
$n^2{}_C = 1.60483$, $n^2{}_D = 1.6080$, $n^2{}_F = 1.61561$

Then $$\frac{n^1{}_F - n^1{}_C}{n^1{}_C} = 1.4884,$$

$$\frac{n^2{}_F - n^2{}_C}{n^2{}_C} = 1.4887,$$

therefore the condition made above for obtaining achromatism would be fulfilled sufficiently closely. On the basis of the values $$n^1{}_D = 1.5286 \text{ and } n^2{}_D = 1.6080$$

it would follow, that $$\alpha^1 = -1° \ 0' \ 45''$$
$$\alpha^2 = \ \ 0° \ 57' \ 45''$$

For this prism are given in the following two tables the deflections, which result for perpendicular incidence ($i^1 = 0$) and for 10° deviation to either side ($i^1 = -10°$ and $i^1 = +10°$), $\varepsilon'$ representing the deflection, to which the twice reflected ray is subjected and $\varepsilon$ that of the ray passing through directly. The first table contains the values, which obtain for light having the wavelength of the line C, the second table those having the wave-length of the line F.

I.

| $n^1 =$ | $-10°$ | $0°$ | $+10°$ |
|---|---|---|---|
| $\varepsilon =$ | $3' \ 10.25''$ | $3' \ 0.08''$ | $3' \ 11.25''$ |
| $\varepsilon' =$ | $3' \ 3.0''$ | $3' \ 0.03''$ | $3' \ 4.03''$ |
| $\varepsilon - \varepsilon' =$ | $7.25''$ | $0.05''$ | $7.22''$ |

II.

| $n^1 =$ | $-10°$ | $0°$ | $+10°$ |
|---|---|---|---|
| $\varepsilon =$ | $3' \ 10.0''$ | $3' \ 0.08''$ | $3' \ 11.25''$ |
| $\varepsilon' =$ | $3' \ 3.0''$ | $3' \ 0.03''$ | $3' \ 4.20''$ |
| $\varepsilon - \varepsilon' =$ | $7.0''$ | $0.05''$ | $7.05''$ |

Hence, not only the deflections, which with a perpendicular direction of entrance result both for the ray passing directly through and for the twice reflected one, agree in both cases almost entirely with the deflection of 3', which is given to a ray of the wave-length of the line D, but the difference between the deflection of the ray passing through directly and that of the twice reflected one is for both colors examined quite immaterial for all practical purposes even at a 10° deviation from a perpendicular direction of entrance. It may be mentioned, that in the present example for a perpendicular direction of entrance even the secondary spectrum is almost totally done away with. Should it be desired to bring about the most favorable conditions, instead of for a perpendicular direction of entrance, for a certain inclination of the entering ray, this might be effected easily by slight alterations in the refractive angles.

The drawing is illustrative of the first of the numerical examples given above. The chosen direction of the entering rays, with which the prism satisfies the invention, is therefore the perpendicular direction, the prism effects a deflection of $$\varepsilon = 2',$$

the kinds of glass made use of are characterized by $$n^1{}_D = 1.5162 \text{ and } n^2{}_D = 1.6202$$

and the refractive angles of the two members are $$\alpha^1 = -31'\ 10''\ \text{and}\ \alpha^2 = 29'\ 10''.$$

I claim:

Refracting prism consisting of two members cemented together, the refractive index and the refractive angle of each member being so chosen, that those rays of a pencil system of parallel rays entering the prism in a chosen direction, which are reflected at the surface of emergence and again at the surface of entrance, finally emerge parallel to those rays emerging directly.

OTTO EPPENSTEIN.

Witnesses:
PAUL KRÜGER,
FRITZ SANDER.

Copies of this patent may be obtained for five cents each, by addressing the "Commissioner of Patents, Washington, D. C."